US012613856B2

(12) United States Patent
Dong et al.

(10) Patent No.: US 12,613,856 B2
(45) Date of Patent: Apr. 28, 2026

(54) DATA COMPARISON WITHOUT INTERRUPTION TO A DATABASE MANAGEMENT SYSTEM

(71) Applicant: International Business Machines Corporation, Armonk, NY (US)

(72) Inventors: Xin Xin Dong, Beijing (CN); Mai Zeng, Beijing (CN); Xing Jun Zhou, Shanghai (CN); Ming Qiao Shang Guan, Beijing (CN); Wei Song, Beijing (CN); Cheng Fang Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 18/755,815

(22) Filed: Jun. 27, 2024

(65) Prior Publication Data

US 2026/0003850 A1     Jan. 1, 2026

(51) Int. Cl.
    *G06F 16/23*        (2019.01)
    *G06F 16/215*       (2019.01)
    *G06F 16/22*        (2019.01)

(52) U.S. Cl.
    CPC ........ *G06F 16/2322* (2019.01); *G06F 16/215* (2019.01); *G06F 16/2282* (2019.01)

(58) Field of Classification Search
    None
    See application file for complete search history.

(56) References Cited

U.S. PATENT DOCUMENTS

| | | | | |
|---|---|---|---|---|
| 7,124,249 B1 * | 10/2006 | Darcy | ................. | G06F 12/0897 |
| | | | | 711/E12.043 |
| 7,127,475 B2 | 10/2006 | Götz | | |
| 9,501,483 B2 * | 11/2016 | Srivas | .................... | G06F 16/13 |
| 9,600,513 B2 | 3/2017 | Bourbonnais et al. | | |
| 9,734,223 B2 | 8/2017 | Bourbonnais et al. | | |
| 10,387,421 B2 * | 8/2019 | Shivarudraiah ... | | G06F 16/24532 |
| 10,467,223 B1 | 11/2019 | Holenstein | | |
| 10,936,599 B2 * | 3/2021 | Murray | ................. | G06F 16/221 |
| 10,949,416 B2 | 3/2021 | Fan | | |
| 11,200,223 B2 * | 12/2021 | Katkade | ............. | G06F 16/2365 |
| 11,250,022 B1 * | 2/2022 | Kuppahally | ............ | G06F 16/27 |

(Continued)

FOREIGN PATENT DOCUMENTS

CN            104346454 B       12/2017

OTHER PUBLICATIONS

Little Table: A Time Series Database and Its Uses (Year: 2000).*

(Continued)

*Primary Examiner* — Kim T Nguyen
(74) *Attorney, Agent, or Firm* — Seed Intellectual Property Law Group LLP

(57)                ABSTRACT

Tables are selected based on timestamp columns to obtain tables changed during a given time period and the selected tables are split into data blocks based on given partition ranges. Changes to data of the data blocks are incrementally copied into datasets. One or more tablespaces identified using a first structured query language query corresponding to a specified timestamp are unloaded based on output of the incrementally copying changes operation. Data of a source site and a target site are compared based on data blocks having the specified timestamp.

17 Claims, 3 Drawing Sheets

(56) References Cited

U.S. PATENT DOCUMENTS

| | | | | |
|---|---|---|---|---|
| 11,615,076 | B2 * | 3/2023 | Sreenivasan | G06F 16/27 |
| | | | | 707/703 |
| 12,332,895 | B2 * | 6/2025 | Sun | G06N 3/0464 |
| 12,475,116 | B1 * | 11/2025 | Kairali | G06F 16/24542 |
| 2012/0203737 | A1 * | 8/2012 | Golos | G06F 16/20 |
| | | | | 707/E17.032 |
| 2013/0124467 | A1 * | 5/2013 | Naidu | G06F 16/22 |
| | | | | 707/610 |
| 2013/0311441 | A1 * | 11/2013 | Erdogan | G06F 16/245 |
| | | | | 707/769 |
| 2016/0092543 | A1 * | 3/2016 | Shivarudraiah | G06F 16/2282 |
| | | | | 707/600 |
| 2016/0092546 | A1 | 3/2016 | Shivarudraiah | |
| 2016/0210307 | A1 | 7/2016 | Pittelko | |
| 2016/0275150 | A1 | 9/2016 | Bournonnais et al. | |
| 2018/0336258 | A1 * | 11/2018 | Lee | G06F 11/36 |
| 2019/0102438 | A1 * | 4/2019 | Murray | G06F 40/109 |
| 2021/0081372 | A1 * | 3/2021 | Lee | G06F 9/4411 |
| 2021/0149907 | A1 * | 5/2021 | Murray | G06F 16/24573 |
| 2021/0303597 | A1 * | 9/2021 | Zhang | G06F 16/275 |
| 2023/0018975 | A1 * | 1/2023 | Sreenivasan | G06F 16/2379 |
| 2023/0394062 | A1 * | 12/2023 | Dong | G06F 16/27 |
| 2025/0068938 | A1 * | 2/2025 | Kim | G06F 1/3203 |
| 2025/0130995 | A1 * | 4/2025 | Chong | G06F 16/24542 |
| 2025/0139093 | A1 * | 5/2025 | Sun | G06N 3/0464 |
| 2025/0252102 | A1 * | 8/2025 | Ma | G06F 16/24542 |

OTHER PUBLICATIONS

Multi-Version Concurrency via Timestamp Range Conflict Management (Year: 2012).*

Dizdarevic J, Avdagic Z, Orucevic F, Omanovic S. Advanced consistency management of highly-distributed transactional database in a hybrid cloud environment using novel R-TBC/RTA approach. Journal of Cloud Computing. Dec. 2021;10:1-31. 31 pages.

* cited by examiner

```
LISTDEF CPY61 INCLUDE TABLESPACE DBBKANK.TSANTRNO PARTLEVEL(3001:3050)
TEMPLATE TMPT UNIT 3390
          |    |    |    DSN(REPORT.MV.&TS..P&PART..D&CDATE)
          |    |    |    DISP(NEW,CATLG,DELETE)
OPTIONS EVENT (ITEMERROR, SKIP)
COPY LIST CPY61 COPYDDN(TMPT) FULL(NO) PARALLEL(100)
CHECKPAGE SHRLEVEL CHANGE
```

*FIG. 2*

```
UNLOAD TABLESPACE DBBKANK.TSANTRNO
DB2 NO
 LOCK NO
 COPYDDN INCCOPY
 SELECT COUNT(DISTINCT BKANTRNO_CS_ACCNO)
 FROM BKANK.TBANTRNO  ORIGINOBID  0
      |    WHERE BKANTRNO_MULT_TNCY_ID  = 'BK000'
      |     |   AND BKANTRNO_ST_DT  =  CURRENT_DATE
      |     |   AND TIME(BKANTRNO_ST_TM)  >'15.00.00'
      |     |   AND TIME(BKANTRNO_ST_TM)  <'15.30.00'
 OUTDDN (SYSDATA)
 FORMAT VARIABLE ALL
 LOADDDN SYSPUNCH LOADOPT (LOG NO NOCOPYPEND REPLACE)
```

*FIG. 3*

```
UNLOAD TABLESPACE DBBKANK.TSANTRNO
DB2 NO
 LOCK NO
 COPYDDN INCCPY61
 SELECT *
 FROM BKANK.TBANTRNO  ORIGINOBID  0
      |    WHERE BKANTRNO_MULT_TNCY_ID  = 'BK000'
      |     |   AND BKANTRNO_ST_DT  =  CURRENT_DATE
      |     |   AND TIME(BKANTRNO_ST_TM)  >'15.00.00'
      |     |   AND TIME(BKANTRNO_ST_TM)  <'15.30.00'
 OUTDDN (SYSDATA)
 FORMAT VARIABLE ALL
 LOADDDN SYSPUNCH LOADOPT (LOG NO NOCOPYPEND REPLACE)
```

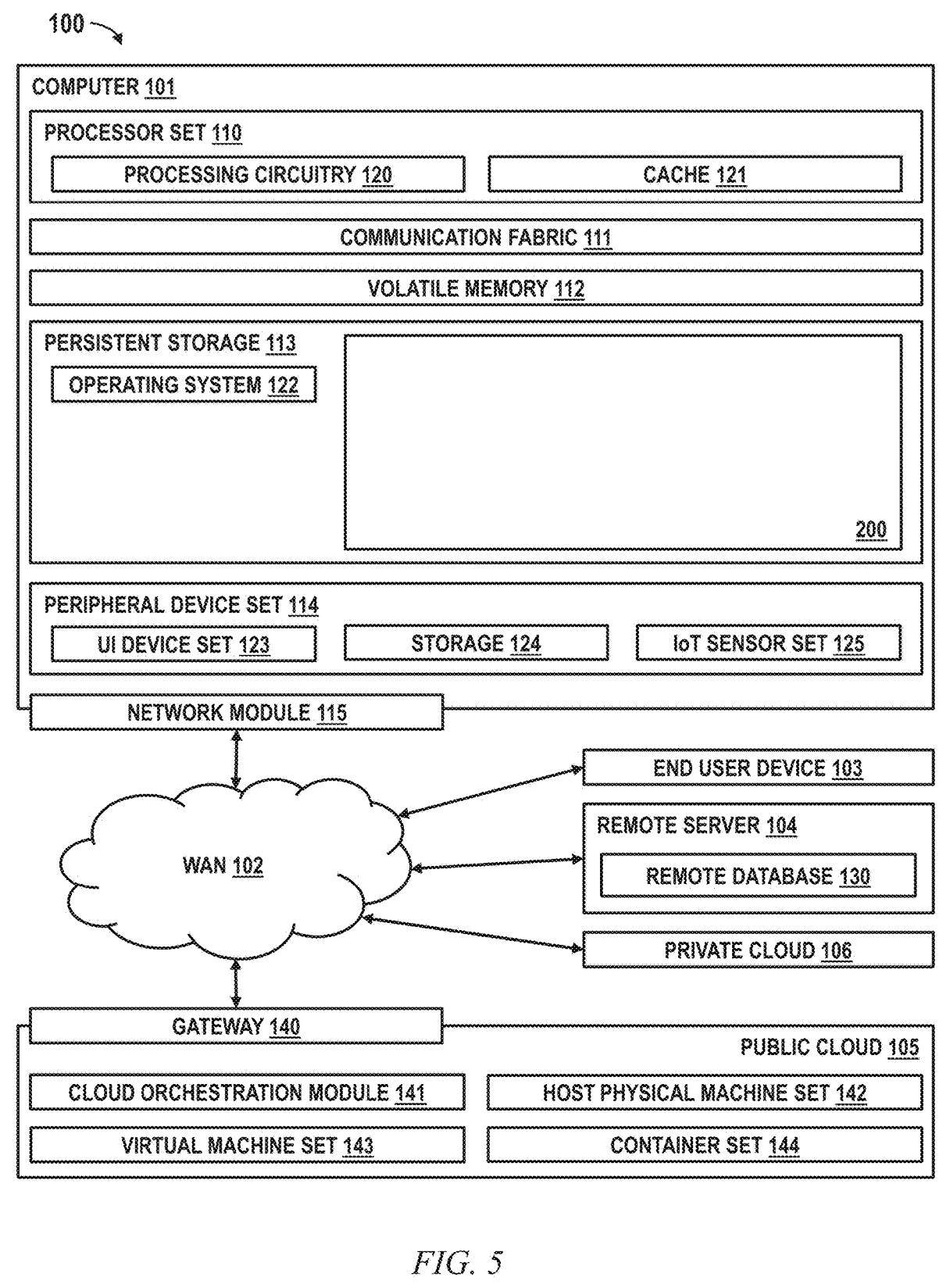

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

*FIG. 5*

DATA COMPARISON WITHOUT INTERRUPTION TO A DATABASE MANAGEMENT SYSTEM

BACKGROUND

The present invention relates generally to the electrical, electronic and computer arts and, more particularly, to database management and data processing.

In a mainframe Active-Active cluster solution, ensuring data consistency is pertinent for system users, who frequently request a comparison of data tables to make sure that the two sites have the same data. In conventional comparison methods at the table level, however, the results are often unsatisfactory. On the one hand, some tables are very large (on the order of one billion rows, for example) and would take several hours to perform a full count comparison (a comparison of all of the data of the table), which is often unacceptable. On the other hand, it is desirable to avoid operations on the production tables and to avoid the comparison operation potentially impacting the transaction rate, especially considering the long running time for the comparison. Moreover, if any data loss occurs, conventional methods cannot identify the first occurrence of the data loss, and fail to recover from the data loss during data mitigation.

BRIEF SUMMARY

Principles of the invention provide systems and techniques for data comparison without interruption to a database management system. In one aspect, an exemplary method includes the operations of selecting tables based on timestamp columns to obtain tables changed during a given time period; splitting the selected tables into data blocks based on given partition ranges; incrementally copying changes to data of the data blocks into datasets; unloading one or more tablespaces identified using a first structured query language query corresponding to a specified timestamp based on output of the incrementally copying changes operation; and comparing data of a source site and a target site based on data blocks having the specified timestamp.

In one aspect, a computer program product comprises one or more tangible computer-readable storage media and program instructions stored on at least one of the one or more tangible computer-readable storage media, the program instructions executable by a processor, the program instructions comprising selecting tables based on timestamp columns to obtain tables changed during a given time period; splitting the selected tables into data blocks based on given partition ranges; incrementally copying changes to data of the data blocks into datasets; unloading one or more tablespaces identified using a first structured query language query corresponding to a specified timestamp based on output of the incrementally copying changes operation; and comparing data of a source site and a target site based on data blocks having the specified timestamp.

In one aspect, a system comprises a memory and at least one processor, coupled to the memory, and operative to perform operations comprising selecting tables based on timestamp columns to obtain tables changed during a given time period; splitting the selected tables into data blocks based on given partition ranges; incrementally copying changes to data of the data blocks into datasets; unloading one or more tablespaces identified using a first structured query language query corresponding to a specified timestamp based on output of the incrementally copying changes operation; and comparing data of a source site and a target site based on data blocks having the specified timestamp.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 2 is an example of software code to generate the incremental copy of block 61 with partition range from 3001 to 3050, in accordance with an example embodiment;

FIG. 3 is an example of an unload blocks with timestamp (UBT) model and the code to unload the blocks with the select count/average associated with the specified timestamp of this cycle based on the ICB output, in accordance with an example embodiment;

FIG. 4 is an example of code to unload the blocks, in accordance with an example embodiment; and FIG. 5 depicts a computing environment according to an embodiment of the present invention.

Figure 1:
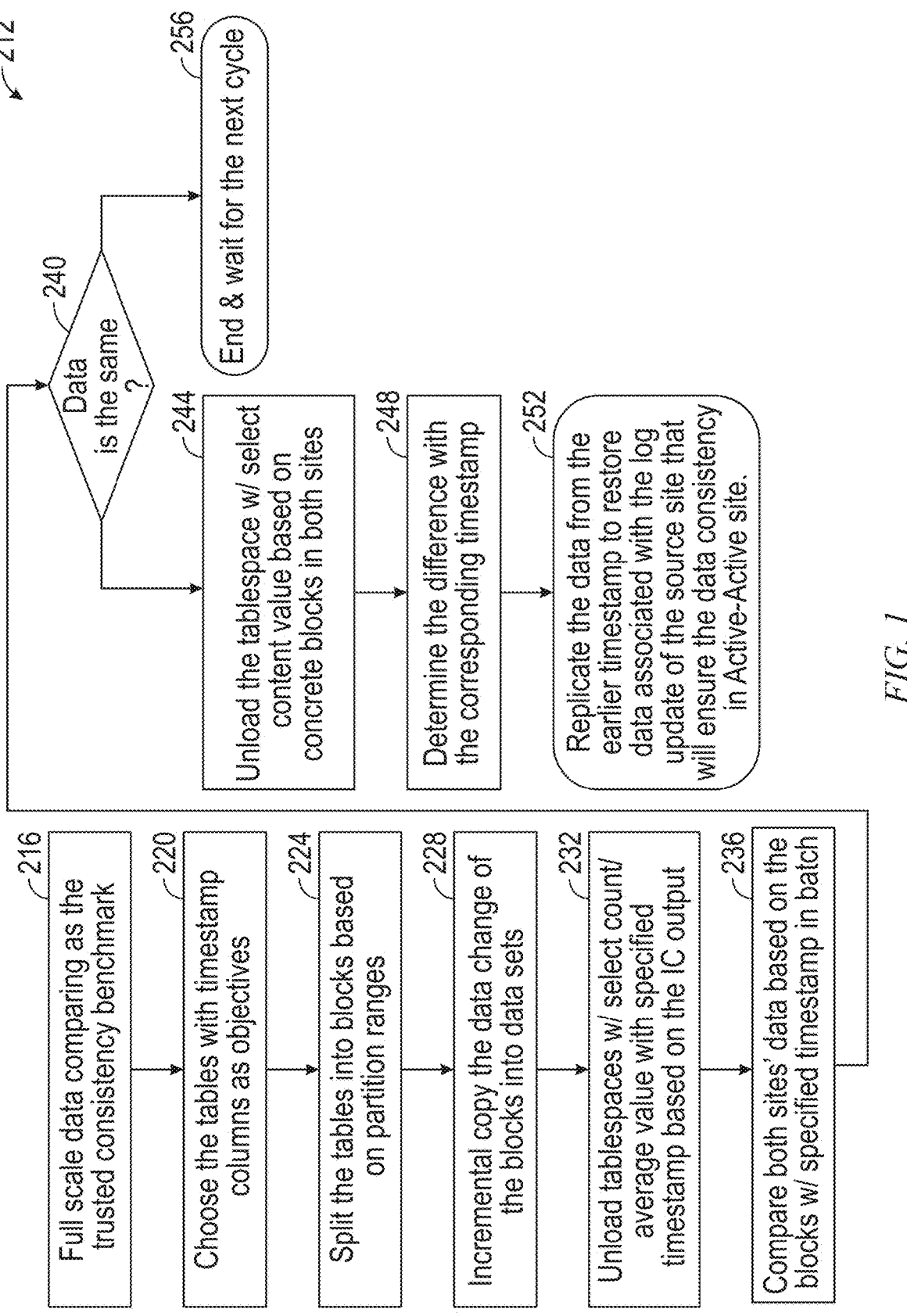
FIG. 1 is a flowchart of an example method for checking data consistency without interrupting DBMS workloads, in accordance with example embodiments.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

One or more embodiments provide techniques for checking data consistency without interrupting DBMS workloads. One or more embodiments also provide techniques for tracing back when an error was introduced by a software replication tool in, for example, an Active-Active cluster solution.

Following the identification of inconsistent data between a source site and a target site, a log update is restored based on the earliest timestamp associated with inconsistent data. In general, a data comparison for a source side and a target side is performed based on a latest committed timestamp (the timestamp corresponding to the latest data that has been committed in the cluster; data committed before the timestamp has already been compared and has been confirmed to be consistent between the sites of the cluster). In example embodiments, data generated during a given time period after the time of the timestamp, such as during a 30-minute period after the timestamp, is compared. An end timestamp of the comparison is defined as the sum of the initial timestamp plus the given time period. Structured query language (SQL) queries (such as select count or select average queries) are performed on the tables during the specified time period and the results of the SQL query are compared (the results of the SQL query are referred to as concrete data and concrete data blocks herein).

In one example embodiment, task modules for performing the above-described tasks include:

- a table space split (TSS) module configured to split a table space into data blocks based on partition ranges;
- an incremental copy blocks (ICB) module configured to incrementally copy a change in the data of the data blocks into datasets (see FIG. 2);
- an unload blocks with timestamp (UBT) module configured to unload the data blocks identified using a SQL query (for example, a select count/average value query) that correspond to a specified timestamp or timestamp range (based on the output of the incremental copy module) (see FIG. 3); and
- a concrete blocks comparison (CBC) module configured to unload the concrete data blocks that have been identified using a SQL query (such as a select content value query) at both cluster sites and to determine the difference in the data of the concrete data blocks that correspond to a specified timestamp (or timestamp range) and that have been determined to have an inconsistency between the source site and the target site (see FIG. 4).

In addition to the references to the indicated figures, each module is discussed further below. Each module can be implemented, for example, using software on a general purpose computer; exemplary software includes a database management system (DBMS) using SQL queries—aspects can also be implemented using custom code in a higher-level language or a combination of custom code interfacing with a DBMS.

A check is performed to determine if the data is the same (decision block 240). If the data is the same (YES block of decision block 240), the method ends and waits for the next cycle (operation 256).

If the data is not the same (NO block of decision block 240), the tablespace with inconsistent data, as identified by the SQL query (the select content value query) and the incremental copy (IC) operation, is unloaded based on the concrete data blocks having different data at the two sites (operation 244). The difference in the data with the corresponding timestamp is determined (operation 248). The data from the earlier timestamp is replicated to restore the data associated with the log update of the source site to ensure data consistency in the Active-Active cluster site (operation 252).

Table Space Split Module

In one example embodiment, a table space split (TSS) module is responsible for splitting the table space into data blocks based on partition ranges. The table space split module is configured to:

- utilize the initial Active-Active cluster environment as the trusted benchmark for the full-scale data comparison to ensure data consistency;
- utilize the tables with timestamp columns as the comparison objects; and
- utilize BLOCKNUM in the configuration file to control the block number and the corresponding partition range of each data block.

The table space split module splits the table space into data blocks based on the partition range. For example, a table TBANTRN0 with 3050 partitions is split by the table space split module into 61 data blocks where each data block has 50 partitions based on:

TABLE

| BKANK.TBANTRN0 with 3050 partitions: |
|---|
| PARTITION KEY(BKANTRN0_MULT_TNCY_ID, BKANTRN0_APP_PRT_NO) |
| BLOCK 1 (PART 1 - PART 50) |
| BLOCK 2 (PART 51 - PART 100) |
| ...... |
| BLOCK 61(PART 3001 - PART 3050) |

FIG. 1 is a flowchart 212 of an example method for checking data consistency without interrupting DBMS workloads, in accordance with example embodiments. In one example embodiment, the data of the source side and the target side are identified as a trusted consistency benchmark (operation 216). Tables are selected based on the timestamp columns to obtain tables changed during the given time period (operation 220). The selected tables are split into blocks based on given partition ranges (operation 224). For example, each block number is defined based on a parameter BLOCKNUM in the configuration file and the tables are split according to the block numbers and the partition ranges.

The change to the data of the data blocks is incrementally copied into datasets (operation 228). Tablespaces identified by a SQL query (such as a select count/average value query) corresponding to a specified timestamp (or timestamp range) are unloaded based on the output of the incremental copy (IC) operation (operation 232). The data of the source site and the target site are compared based on the data blocks (in the current batch of data blocks) having the specified timestamp (or timestamp range) (operation 236).

Incremental Copy Blocks Module

In one example embodiment, an incremental copy blocks (ICB) module incrementally copies the changes to the data of the data blocks into datasets. The incremental copy blocks module is configured to:

- copy the changes to the data of the data blocks (of the current batch of data blocks) since the last incremental copy into the datasets where the block data is based on the partition range(s);
- uses the copying functionality of the PARALLEL task in the DBMS to speed up the incremental copying of the block; and
- controls the capabilities of the PARALLEL task in the DBMS to obtain the maximum parallelism for handling the objects.

The incremental copy blocks module includes:

- PARTLEVEL: used to represent the partition range in the data block;
- TEMPLATE DSN (data set name): used to dynamically generate the output dataset name; and
- PARALLEL: utilized to speed up the incremental copy of the block, as described above.

FIG. 2 is an example of software code for generating the incremental copy of block 61 ("CPY61") with partition range from 3001 to 3050, in accordance with an example embodiment. In one example embodiment, the incremental copy is generated in the present cycle and executes in parallel in a batch mode. It is noted that "61," "3001," and "3050" in this paragraph are not reference characters but refer to actual segments of the example code in FIG. 2.

Unload Blocks with Timestamp (UBT) Module

In one example embodiment, an unload blocks with timestamp (UBT) module unloads the data blocks identified with a SQL query (such as a select count/average value query) having a specified timestamp or timestamp range based on the incremental copy output. The UBT module is configured to:

compare all committed timestamps from the applied address spaces and select the earliest committed timestamp as the starting point for comparison, to give an optimized value for the timestamp range in this cycle (it is noted that there are multiple applied address spaces in the environment; a capture program reads the database (such as DB2) log for changes to a specified source table, the data change logs are transmitted to the target side as messages over queues via the applied address space, and the database changes are replayed on the target side to sync-up the data) (in a non-limiting example, for a database such as the DB2® database (registered mark of International Business Machines Corporation, Armonk, NY, USA), in an Active-Active solution, a Q application (QREP) is used to transmit transactions and data between the source side and the target side. The Q Capture program reads the database log for changes to a source table that you specify. The program then sends transactions as messages over queues, where they are read and applied to targets by the Q Apply program-other embodiments can use other database programs);

unload the data blocks identified by the SQL query (such as a select count/average value query) corresponding to a specified timestamp or timestamp range based on the incremental copy output;

transmit the source site output to a target site and compare the merged output from both sites; and check each block's comparison result and summarize the data blocks having inconsistent data into a difference reporter.

The earliest source committed timestamp (SCT1) is chosen from the applied monitor table (a statistics table that records the latest committed timestamps, which represents a time of the latest commitment where all data recorded before the timestamp is committed and data recorded after the timestamp may be rolled back or committed) by selecting the minimum value of the latest_commit_timestamp from different applied address spaces at the end of this cycle. This means that all the data from the source site before the timestamp has been applied in the target site. Thus, the UBT module specifies the timestamp range between the last SCT1 and the current SCT1.

FIG. 3 is an example of the UBT model and the code to unload the blocks identified by an SQL query (such as a select count/average query) corresponding to the specified timestamp or timestamp range of this cycle based on the ICB output, in accordance with an example embodiment. The unload output is transmitted to the target site and the merged output from both sites are compared. In the example, 15:00:00 is the start timestamp (all data before 15:00:00 is committed and compared), and 15:30:00 is the end timestamp. The data stored during the time window is compared by running SQL queries on both sites.

Concrete Blocks Comparison Module (CBC)

In one example embodiment, the concrete blocks comparison module (CBC) unloads the concrete data blocks identified by a SQL query (such as a select content value query) having the specified timestamp range at both cluster sites (source site and target site) and determines the concrete data blocks having different data (different SQL query results) associated with the specified timestamp or timestamp range. The concrete blocks comparison module is configured to:

unload, based on the inconsistent concrete data blocks from the difference reporter in the UBT module, the inconsistent concrete data blocks identified by a SQL query (such as a select content value query) having the specified timestamp range at both cluster sites (source site and target site);

compare the content of the concrete data blocks and record the corresponding timestamp and content; and determine the earliest timestamp of all the timestamps associated with the data of the concrete data blocks that have different SQL query results, restore the inconsistent data of the log update and replay from this timepoint.

FIG. 4 is an example of code to unload the data blocks, in accordance with an example embodiment. Assuming that part 3 of block 5 and part 5 of block 61 have data that is different (based on the UBT module comparison result), then the CBC module unloads the inconsistent concrete data blocks identified by the SQL query of the specified timestamp range at both cluster sites.

The difference in the data of both cluster sites is compared and the difference report is generated using the concrete timestamp. Based on the earliest timestamp of the data blocks having inconsistent data, capture (an address space which can set a "start" parameter) is recycled (set) to a specified start time. Then the inconsistent data of the log is restored from the "start" timestamp for the applied address space and the transactions to the target site will be replayed to restore the inconsistent data of the log update. It is noted that "3," "5," and "61" in this paragraph are not reference characters but refer to exemplary blocks or parts of blocks of data. In a non-limiting example, for a database such as the DB2® database, capture is an address space of the QREP (Q replication); and recycle capture can pick up the start time specified in the parameter-other embodiments can use other database programs.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

a method for comparing data tables without any disruption of the corresponding database management system (DBMS);

ensuring that a recovery from data loss will occur at some point in time in an Active-Active cluster solution; and confirmation of data consistency at any time without any impact on the transaction rate in a production environment with an Active-Active cluster solution.

Given the discussion thus far, it will be appreciated that, in general terms, an exemplary method, according to an aspect of the invention, includes the operations of selecting tables based on timestamp columns to obtain tables changed during a given time period (operation 220); splitting the selected tables into data blocks based on given partition ranges (operation 224); incrementally copying changes to data of the data blocks into datasets (operation 228); unloading one or more tablespaces identified using a first structured query language query corresponding to a specified timestamp based on output of the incrementally copying changes operation (operation 232); and comparing data of a source site and a target site based on data blocks having the specified timestamp (operation 236).

In example embodiments, responsive to the comparing data indicating sameness:

a tablespace with inconsistent data, as identified by a second structured query language query, is unloaded based on concrete data blocks having different data at the source site and the target site (operation 244); a difference in the inconsistent data is determined (operation 248); and data associated with an earlier timestamp is replicated to restore data associated with a log update of the source site to ensure data consistency in the target site (operation 252).

In example embodiments, the data of the source side and the target side are identified as a trusted consistency benchmark (operation 216).

In example embodiments, one or more tablespaces are identified using the first structured query language queries.

In example embodiments, the first structured query language query is one of a select count query and a select average value query.

In example embodiments, the splitting the selected tables into data blocks is based on block numbers defined based on a parameter BLOCKNUM in a configuration file.

In example embodiments, a table space split (TSS) module, an incremental copy blocks (ICB) module, an unload blocks with timestamp (UBT) module, and a concrete blocks comparison (CBC) module are instantiated, wherein the step of splitting the selected tables into data blocks is carried out with the table space split (TSS) module; the step of incrementally copying the changes to the data of the data blocks into the datasets is carried out with the incremental copy blocks (ICB) module; the step of unloading the one or more tablespaces is carried out with the unload blocks with timestamp (UBT) module; and the step of comparing the data is carried out with the concrete blocks comparison (CBC) module.

In one aspect, a computer program product comprises one or more tangible computer-readable storage media and program instructions stored on at least one of the one or more tangible computer-readable storage media, the program instructions executable by a processor, the program instructions comprising selecting tables based on timestamp columns to obtain tables changed during a given time period (operation 220); splitting the selected tables into data blocks based on given partition ranges (operation 224); incrementally copying changes to data of the data blocks into datasets (operation 228); unloading one or more tablespaces identified using a first structured query language query corresponding to a specified timestamp based on output of the incrementally copying changes operation (operation 232);

and comparing data of a source site and a target site based on data blocks having the specified timestamp (operation 236).

In one aspect, a system comprises a memory and at least one processor, coupled to the memory, and operative to perform operations comprising selecting tables based on timestamp columns to obtain tables changed during a given time period (operation 220); splitting the selected tables into data blocks based on given partition ranges (operation 224); incrementally copying changes to data of the data blocks into datasets (operation 228); unloading one or more tablespaces identified using a first structured query language query corresponding to a specified timestamp based on output of the incrementally copying changes operation (operation 232); and comparing data of a source site and a target site based on data blocks having the specified timestamp (operation 236). Refer now to FIG. 5.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as database management system 200 incorporating aspects of the invention. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 5. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   selecting tables based on timestamp columns to obtain tables changed during a given time period;

splitting the selected tables into data blocks based on given partition ranges;

incrementally copying changes to data of the data blocks into datasets;

unloading one or more tablespaces identified using a first structured query language query corresponding to a specified timestamp based on output of the incrementally copying changes operation; and comparing data of a source site and a target site based on data blocks having the specified timestamp;

if the data of the source site and the target site are not the same:

unloading a tablespace with inconsistent data, as identified by a second structured query language query, based on concrete data blocks having different data at the source site and the target site;

determining a difference in the inconsistent data; and replicating data associated with an earlier timestamp to restore data associated with a log update of the source site to ensure data consistency in the target site.

2. The method of claim 1, wherein the data of the source side and the target side are identified as a trusted consistency benchmark.

3. The method of claim 1, further comprising identifying the one or more tablespaces using the first structured query language query queries.

4. The method of claim 1, wherein the first structured query language query is one of a select count query and a select average value query.

5. The method of claim 1, wherein the splitting the selected tables into data blocks is based on block numbers defined based on a parameter BLOCKNUM in a configuration file.

6. The method of claim 1, further comprising instantiating a table space split (TSS) module, an incremental copy blocks (ICB) module, an unload blocks with timestamp (UBT) module, and a concrete blocks comparison (CBC) module, wherein:

the step of splitting the selected tables into data blocks is carried out with the table space split (TSS) module;

the step of incrementally copying the changes to the data of the data blocks into the datasets is carried out with the incremental copy blocks (ICB) module;

the step of unloading the one or more tablespaces is carried out with the unload blocks with timestamp (UBT) module; and the step of comparing the data is carried out with the concrete blocks comparison (CBC) module.

7. A computer program product, comprising:

one or more tangible computer-readable storage media and program instructions stored on at least one of the one or more tangible computer-readable storage media, the program instructions executable by a processor, the program instructions comprising:

selecting tables based on timestamp columns to obtain tables changed during a given time period;

splitting the selected tables into data blocks based on given partition ranges;

incrementally copying changes to data of the data blocks into datasets;

unloading one or more tablespaces identified using a first structured query language query corresponding to a specified timestamp based on output of the incrementally copying changes operation; and comparing data of a source site and a target site based on data blocks having the specified timestamp if the data of the source site and the target site are not the same:

unloading a tablespace with inconsistent data, as identified by a second structured query language query, based on concrete data blocks having different data at the source site and the target site;

determining a difference in the inconsistent data; and replicating data associated with an earlier timestamp to restore data associated with a log update of the source site to ensure data consistency in the target site.

8. The computer program product of claim 7, the program instructions further comprising identifying the one or more tablespaces using the first structured query language query queries.

9. The computer program product of claim 7, wherein the first structured query language query is one of a select count query and a select average value query.

10. The computer program product of claim 7, wherein the splitting the selected tables into data blocks is based on block numbers defined based on a parameter BLOCKNUM in a configuration file.

11. The computer program product of claim 8, the program instructions further comprising instantiating a table space split (TSS) module, an incremental copy blocks (ICB) module, an unload blocks with timestamp (UBT) module, and a concrete blocks comparison (CBC) module, wherein:

the step of splitting the selected tables into data blocks is carried out with the table space split (TSS) module;

the step of incrementally copying the changes to the data of the data blocks into the datasets is carried out with the incremental copy blocks (ICB) module;

the step of unloading the one or more tablespaces is carried out with the unload blocks with timestamp (UBT) module; and the step of comparing the data is carried out with the concrete blocks comparison (CBC) module.

12. A system comprising:

a memory; and at least one processor, coupled to said memory, and operative to perform operations comprising:

selecting tables based on timestamp columns to obtain tables changed during a given time period;

splitting the selected tables into data blocks based on given partition ranges;

incrementally copying changes to data of the data blocks into datasets;

unloading one or more tablespaces identified using a first structured query language query corresponding to a specified timestamp based on output of the incrementally copying changes operation; and comparing data of a source site and a target site based on data blocks having the specified timestamp;

if the data of the source site and the target site are not the same:

unloading a tablespace with inconsistent data, as identified by a second structured query language query, based on concrete data blocks having different data at the source site and the target site;

determining a difference in the inconsistent data; and replicating data associated with an earlier timestamp to restore data associated with a log update of the source site to ensure data consistency in the target site.

13. The system of claim 12, wherein the data of the source side and the target side are identified as a trusted consistency benchmark.

14. The system of claim 12, the operations further comprising identifying the one or more tablespaces using the first structured query language query queries.

15. The system of claim 12, wherein the first structured query language query is one of a select count query and a select average value query.

16. The system of claim 12, wherein the splitting the selected tables into data blocks is based on block numbers defined based on a parameter BLOCKNUM in a configuration file.

17. The system of claim 12, the operations further comprising instantiating a table space split (TSS) module, an incremental copy blocks (ICB) module, an unload blocks with timestamp (UBT) module, and a concrete blocks comparison (CBC) module, wherein:

the step of splitting the selected tables into data blocks is carried out with the table space split (TSS) module;

the step of incrementally copying the changes to the data of the data blocks into the datasets is carried out with the incremental copy blocks (ICB) module;

the step of unloading the one or more tablespaces is carried out with the unload blocks with timestamp (UBT) module; and the step of comparing the data is carried out with the concrete blocks comparison (CBC) module.

* * * * *